US012645131B2

(12) United States Patent
Wu et al.

(10) Patent No.:     US 12,645,131 B2
(45) Date of Patent:        Jun. 2, 2026

(54) OPTICAL ELEMENT DRIVING MECHANISM

(71) Applicant: Actutek Corporation, Taoyuan City (TW)

(72) Inventors: Chia-Che Wu, Taoyuan City (TW); Chao-Chang Hu, Taoyuan City (TW); Yu-Chiao Lo, Taoyuan City (TW)

(73) Assignee: Actutek Corporation, Taoyuan (TW)

( * ) Notice: Subject to any disclaimer, the term of this patent is extended or adjusted under 35 U.S.C. 154(b) by 268 days.

(21) Appl. No.: 18/495,102

(22) Filed: Oct. 26, 2023

(65) Prior Publication Data

US 2024/0142746 A1     May 2, 2024

Related U.S. Application Data

(60) Provisional application No. 63/420,236, filed on Oct. 28, 2022.

(51) Int. Cl.
| | |
|---|---|
| *G03B 5/00* | (2021.01) |
| *G02B 3/14* | (2006.01) |
| *G02B 7/08* | (2021.01) |
| *G02B 27/64* | (2006.01) |
| *G03B 13/36* | (2021.01) |

(52) U.S. Cl.
CPC ................. *G03B 5/00* (2013.01); *G02B 3/14* (2013.01); *G02B 7/08* (2013.01); *G02B 27/646* (2013.01); *G03B 13/36* (2013.01); *G03B 2205/0069* (2013.01)

(58) Field of Classification Search
None
See application file for complete search history.

(56) References Cited

U.S. PATENT DOCUMENTS

2022/0244785 A1 *   8/2022   Hu ....................... H02K 11/215

* cited by examiner

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57)     ABSTRACT

An optical element driving mechanism is for accommodating a first optical element and includes a fixed assembly, a movable part and a driving assembly. The movable part is configured to connect a second optical element, the second optical element corresponds to the first optical element, and the movable part is movable relative to the fixed assembly. The driving assembly is configured to drive the movable part to move relative to the fixed assembly. The fixed assembly includes a first accommodating space configured to accommodate the first optical element.

19 Claims, 11 Drawing Sheets

OPTICAL ELEMENT DRIVING MECHANISM

CROSS REFERENCE TO RELATED APPLICATIONS

This application claims the benefit of U.S. Provisional Application No. 63/420,236, filed Oct. 28, 2022, the entirety of which is incorporated by reference herein.

BACKGROUND OF THE INVENTION

Field of the Disclosure

The present disclosure relates to an optical element driving mechanism, and in particular it relates to an optical element driving mechanism with a long focal length and anti-shake function.

Description of the Related Art

As technology has developed, many of today's electronic devices (such as smartphones) have a camera or video functionality. Using the camera modules disposed in electronic devices, users can operate their electronic devices to capture photographs and record videos.

Today's design of electronic devices continues to follow the trend of miniaturization, meaning that the various components of the camera module and its structure must also be continuously reduced in size, so as to achieve miniaturization. In general, the driving mechanism in a camera module has a camera lens holder configured to hold a camera lens, and the driving mechanism can perform the functions of auto focusing and optical image stabilization. However, although existing driving mechanisms can achieve the aforementioned functions of photography and video recording, they still cannot meet all the needs of users.

Therefore, how to design a camera module capable of performing autofocus, optical anti-shake functions and achieving miniaturization at the same time are topics nowadays that need to be discussed and solved.

BRIEF SUMMARY OF THE INVENTION

Accordingly, one objective of the present disclosure is to provide an optical element driving mechanism to solve the above problems.

According to some embodiments of the disclosure, an optical element driving mechanism is provided for accommodating a first optical element and including a fixed assembly, a movable part and a driving assembly. The movable part is configured to connect a second optical element, the second optical element corresponds to the first optical element, and the movable part is movable relative to the fixed assembly. The driving assembly is configured to drive the movable part to move relative to the fixed assembly. The fixed assembly includes a first accommodating space configured to accommodate the first optical element.

According to some embodiments, the movable part includes a second accommodation space configured to accommodate the first optical element. The second accommodation space is located in the first accommodation space. The second optical element defines an optical axis. The optical axis passes through the second optical element and the first optical element. When viewed along the optical axis, the movable part has a long strip-shaped structure.

According to some embodiments, the movable part further includes a first side wall, a second side wall and a first opening. When viewed along the optical axis, the first side wall is located on one side of the first optical element. When viewed along the optical axis, the second side wall is located on other side of the first optical element. When viewed along the optical axis, the first optical element is located between the first side wall and the second side wall. The first opening corresponds to the first optical element. When viewed along a first axis, at least a portion of the first optical element is exposed from the first opening. The first axis is not parallel to the optical axis.

According to some embodiments, the movable part further includes a top wall and a second opening. The top wall corresponds to the second optical element. The second opening corresponds to the second optical element and is located on the top wall. The optical axis passes through the second opening.

According to some embodiments, the fixed assembly further includes a third opening. The third opening corresponds to the second optical element. The third opening corresponds to the first optical element. When viewed along the optical axis, the third opening is larger than the second opening.

According to some embodiments, the fixed assembly further includes a base and an outer frame. The base has a plate-shaped structure. The outer frame is fixedly connected to the base and forms the first accommodation space. The outer frame has a first outer wall and a second outer wall. The first outer wall and the second outer wall each have a plate-shaped structure.

According to some embodiments, the fixed assembly further includes a first supporting portion which is disposed on the base to accommodate the first optical element. The first optical element is fixedly connected to the first supporting portion of the fixed assembly. The third opening is formed by the first outer wall and the second outer wall. The first outer wall and the second outer wall are perpendicular to each other. An external light is incident on the third opening in the first direction and is emitted in the second direction from the third opening. The first direction is not parallel to the second direction. The first direction is parallel to the first axis. The movable part is movable relative to the first optical element.

According to some embodiments, a first surface of the first side wall faces the first optical element. A second surface of the first side wall and the first surface face opposite directions. There is a gap between the first surface and the fixed assembly. There is another gap between the second surface and the fixed assembly. A third surface of the second side wall faces the first optical element. A fourth surface of the second side wall and the third surface face opposite directions. There is another gap between the third surface and the fixed assembly. There is another gap between the fourth surface and the fixed assembly. The third surface faces the first surface. The fixed assembly further includes a fourth opening corresponding to the second optical element. When viewed along the first axis, the third opening overlaps at least a portion of the fourth opening. The fourth opening is located at the base.

According to some embodiments, the optical element driving mechanism further includes a connecting assembly, so that the movable part is movably connected to the fixed assembly through the connecting assembly. The connecting assembly includes a first elastic member and a second elastic member. The first elastic member and the second elastic member respectively have a first flexible portion and a second flexible portion. The first flexible portion has flexibility. The second flexible portion has flexibility.

According to some embodiments, when viewed along the optical axis, the first flexible portion and the first optical element are arranged along a second axis. The second axis is not parallel to the first axis. When viewed along the optical axis, the longitudinal axis of the movable part having a long strip-shaped structure is parallel to the second axis. When viewed along the optical axis, the first flexible portion and the second flexible portion are arranged along the second axis. When viewed along the optical axis, the center of the second optical element is located between the first flexible portion and the second flexible portion.

According to some embodiments, the first elastic member has a first connecting end which is fixedly connected to the fixed assembly. The first connecting end is affixed to a first setting portion of the fixed assembly. The first elastic member further has a second connecting end which is fixedly connected to the movable part. The first flexible portion is connected between the first connecting end and the second connecting end. The second elastic member has a third connecting end which is fixedly connected to the fixed assembly. The third connecting end is affixed to a second setting portion of the fixed assembly. The second elastic member further has a fourth connecting end which is fixedly connected to the movable part. The second flexible portion is connected between the third connecting end and the fourth connecting end.

According to some embodiments, when viewed along the optical axis, the first setting portion, the second optical element and the second setting portion are arranged along the second axis. The first setting portion and the second setting portion correspond to the driving assembly. A first avoidance portion of the movable part corresponds to the first setting portion. The first avoidance portion has a recessed structure.

According to some embodiments, when viewed in the first direction, a portion of the first optical element is exposed from the third opening. When viewed in the first direction, a portion of the second optical element is exposed from the third opening. When viewed in a third direction, the first optical element is not exposed from the fourth opening. When viewed in the third direction, a portion of the second optical element is exposed from the fourth opening. The third direction is opposite to the first direction. At least a portion of the driving assembly is disposed on the first setting portion and the second setting portion. When viewed along the optical axis, the optical element driving mechanism does not include any flexible portion which is arranged with the second optical element along the first axis.

According to some embodiments, the first optical element and the second optical element have different materials. The first optical element and the second optical element have different material states. The second optical element is a liquid lens. The first optical element includes a solid lens.

According to some embodiments, the second optical element includes an optical fixed portion, a main body and a pushing portion. The optical fixed portion is fixedly connected to the fixed assembly. The optical fixed portion is affixed to the fixed assembly by laser welding. The optical axis passes through the main body. The pushing portion is fixedly connected to the movable part. The pushing portion has a ring-shaped structure. When viewed along the optical axis, the optical fixed portion overlaps at least a portion of the connecting assembly. The driving assembly includes a first driving element and a second driving element which are respectively disposed on the first side wall and the second side wall. The first driving element and the second driving element are configured to drive the movable part to rotate around a first rotation axis, so that the pushing portion pushes the main body to change the optical properties of the second optical element.

According to some embodiments, the movable part further includes a rear side wall which is connected between the first side wall and the second side wall. When viewed along the first axis, there is another gap between the rear side wall and the base. When viewed along the first axis, the movable part surrounds the first optical element. When viewed along the optical axis, the first rotation axis is located between the first flexible portion and the second flexible portion.

According to some embodiments, the driving assembly further includes a third driving element which is disposed on the rear side wall. The third driving element is configured to drive the movable part to rotate around a second rotation axis, so that the pushing portion pushes the main body to change the optical properties of the second optical element. When viewed along the optical axis, the second rotation axis passes through the first flexible portion and the second flexible portion. The second rotation axis is not parallel to the first rotation axis. The second rotation axis is perpendicular to the first rotation axis. North-pole and South-pole of each of the first driving element and the second driving element are arranged along the optical axis. North-pole and South-pole of the third driving element are arranged along the first axis.

According to some embodiments, the driving assembly further includes a first coil and a second coil, corresponding to the first driving element and the second driving element respectively. The optical element driving mechanism further includes a circuit assembly which is fixedly disposed on the base of the fixed assembly. The circuit assembly includes a first circuit portion and a second circuit portion. The first coil and the second coil are respectively fixedly disposed on the first circuit portion and the second circuit portion. The base includes the first setting portion and the second setting portion. The first setting portion and the second setting portion respectively form a first accommodation hole and a second accommodation hole. The first coil and the second coil are respectively located in the first accommodation hole and the second accommodation hole. The driving assembly further includes a third coil corresponding to the third driving element. The circuit assembly further includes a third circuit portion which is connected between the first circuit portion and the second circuit portion. The third coil is fixedly disposed on the third circuit portion. The base further includes a third setting portion which is connected between the first setting portion and the second setting portion. The third setting portion, the first setting portion and the second setting portion are integrally formed in one piece. A third accommodation hole is formed on the third setting portion. The third coil is located in the third accommodation hole. The third driving element and the third coil are arranged along the optical axis.

According to some embodiments, North-pole and South-pole of each of the first driving element and the second driving element are arranged along the first axis. The driving assembly further includes a first coil and a second coil, corresponding to the first driving element and the second driving element respectively. The optical element driving mechanism further includes a circuit assembly which is fixedly disposed on the base of the fixed assembly. The circuit assembly includes a first circuit portion and a second circuit portion. The first coil and the second coil are respectively fixedly disposed on the first circuit portion and the second circuit portion.

According to some embodiments, the driving assembly further includes a third coil and a fourth coil, corresponding to the first driving element and the second driving element respectively. The circuit assembly further includes a third circuit portion which is connected to the first circuit portion and the second circuit portion. The third coil and the fourth coil are fixedly disposed on the third circuit portion. The third coil and the fourth coil are configured to respectively act with the first driving element and the second driving element to generate an electromagnetic driving force, thereby driving the movable part to rotate around a second rotation axis, so that the pushing portion pushes the main body to change the optical properties of the second optical element. When viewed along the optical axis, the second rotation axis is located between the first flexible portion and the second flexible portion. When viewed along the optical axis, the first rotation axis passes through the first flexible portion and the second flexible portion.

The present disclosure provides an optical element driving mechanism, which can be a periscope lens mechanism, including a fixed assembly, a driving assembly, a movable part and a connecting assembly. The movable part is movably connected to the base of the fixed assembly through the connecting assembly, and the movable part surrounds the first optical element. The optical fixed portion of the second optical element is affixed to the outer frame of the fixed assembly, and the pushing portion is fixedly connected to the movable part.

The driving assembly is configured to drive the movable part to move relative to the base and the first optical element to drive the pushing portion to push the thin film and the liquid, thereby changing the optical properties of the second optical element, so as to achieve the purpose of optical image stabilization. Because there is a gap between the movable part and the base, the movable part does not collide with the base and cause damage when rotating.

It is worth noting that the external light is emitted into the first optical module along the first axis (the Z-axis), and the first optical module does not include any flexible portion which is arranged with the second optical element along the first axis. Therefore, such a configuration can significantly reduce the height of the optical element driving mechanism along the Z-axis so as to achieve the purpose of thinning.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

6

Figure 1:
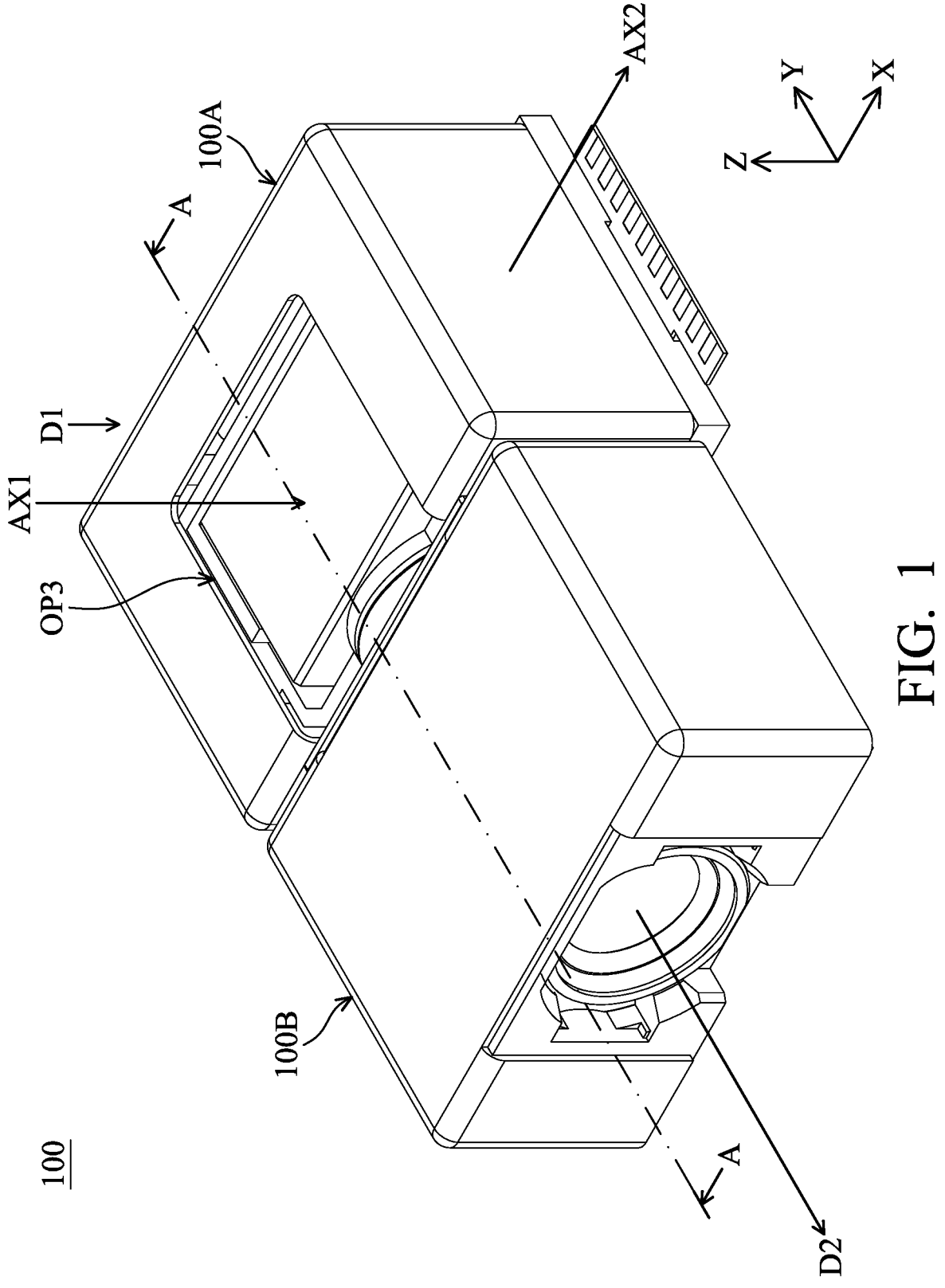

FIG. 1 is a schematic diagram of an optical element driving mechanism 100 according to an embodiment of the present disclosure.

Figure 2:
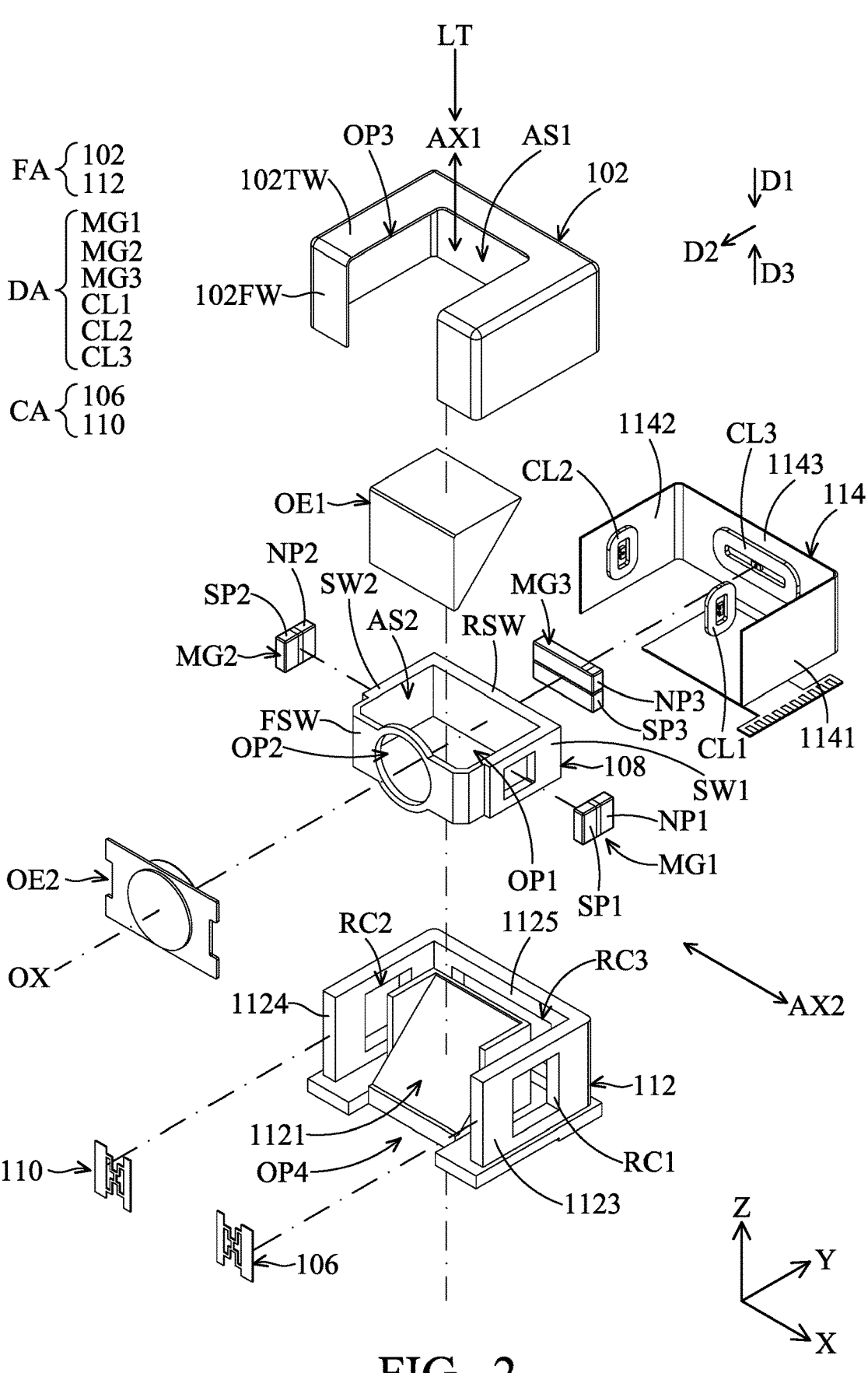

FIG. 2 is an exploded diagram of a partial structure of the optical element driving mechanism 100 according to an embodiment of the present disclosure.

Figure 3:
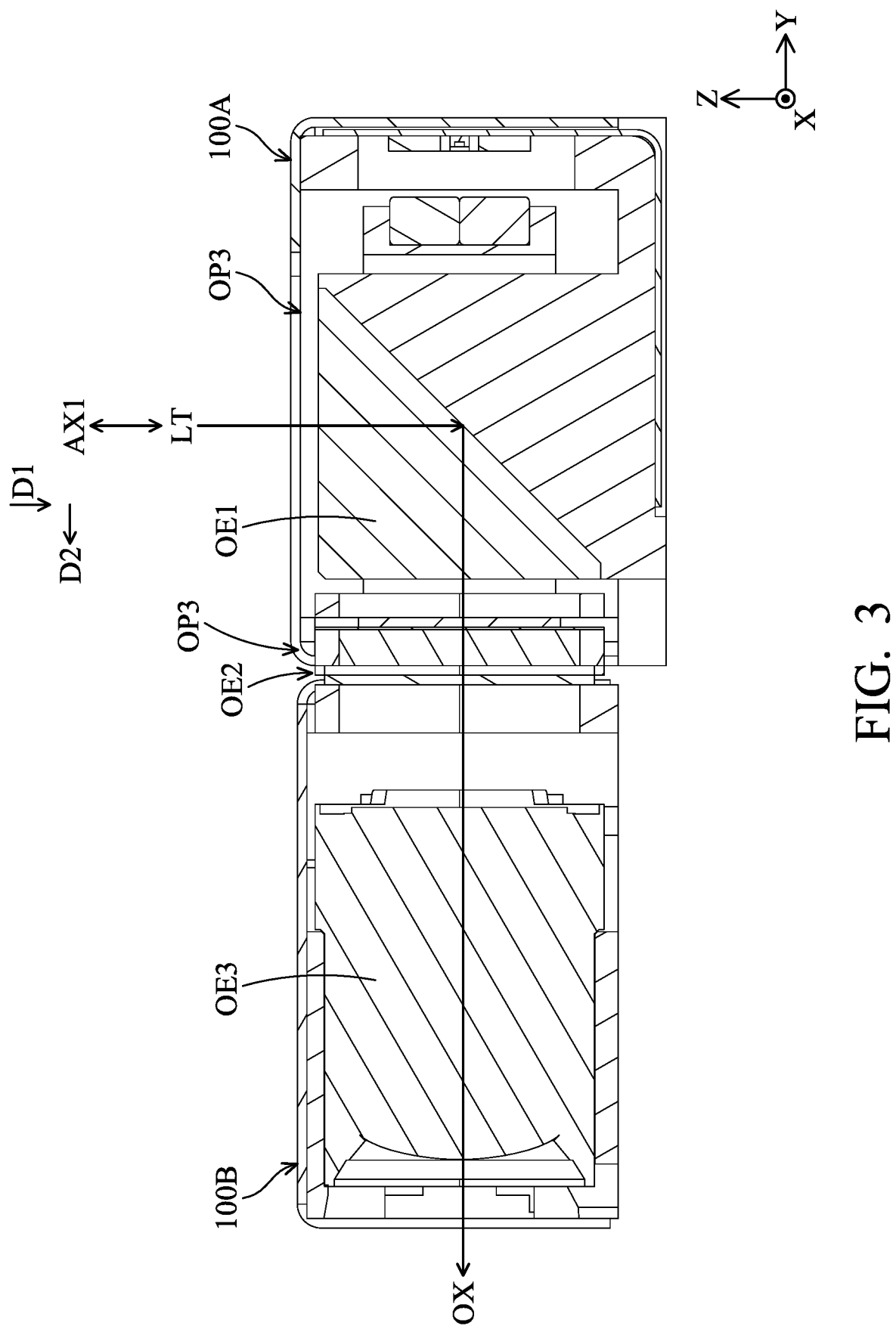

FIG. 3 is a cross-sectional view of the optical element driving mechanism 100 along line A-A in FIG. 1 according to an embodiment of the present disclosure.

Figure 4:
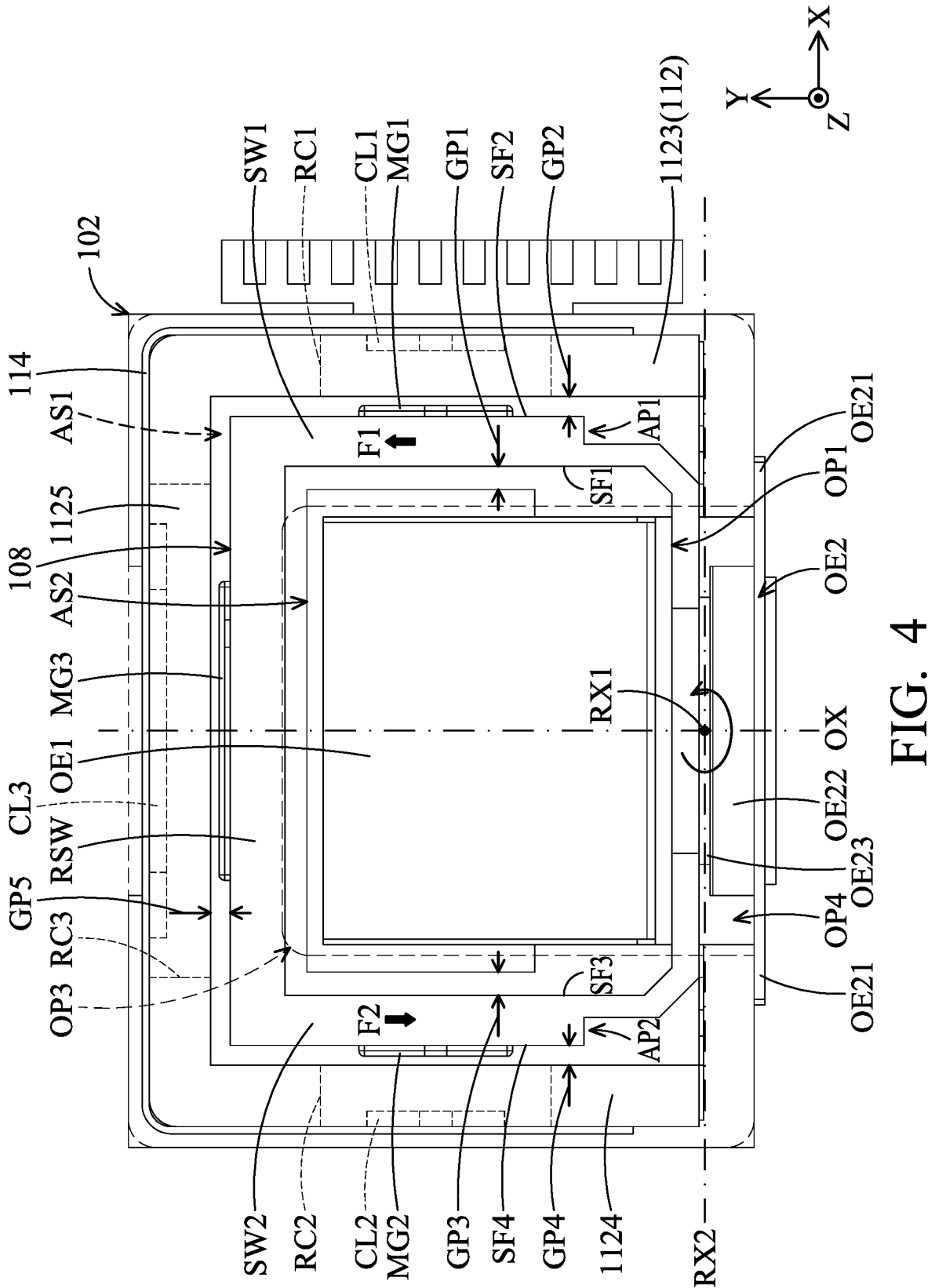

FIG. 4 is a top view of the first optical module 100A according to an embodiment of the present disclosure.

Figure 5:
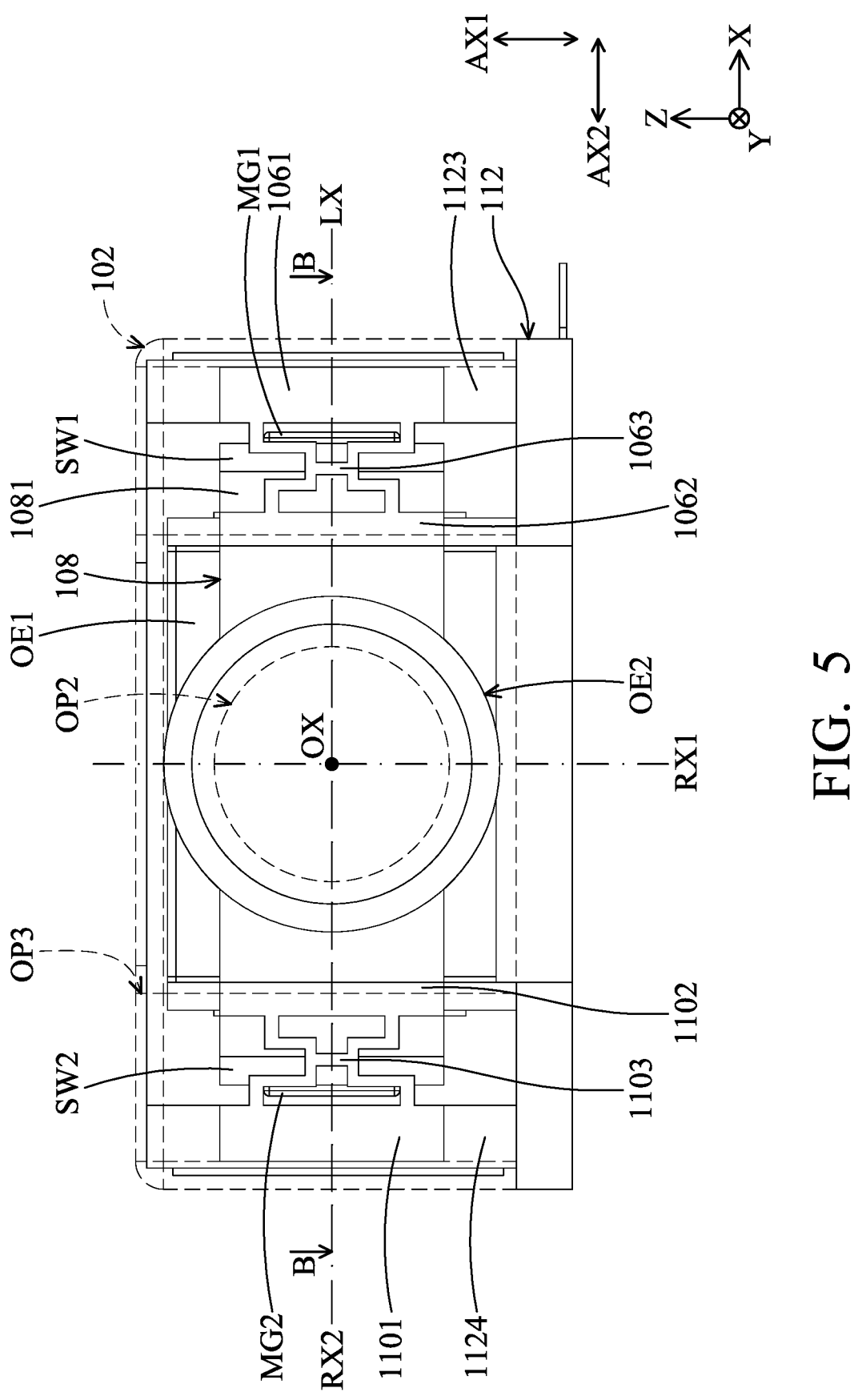

FIG. 5 is a font view of the first optical module 100A according to an embodiment of the present disclosure.

Figure 6:
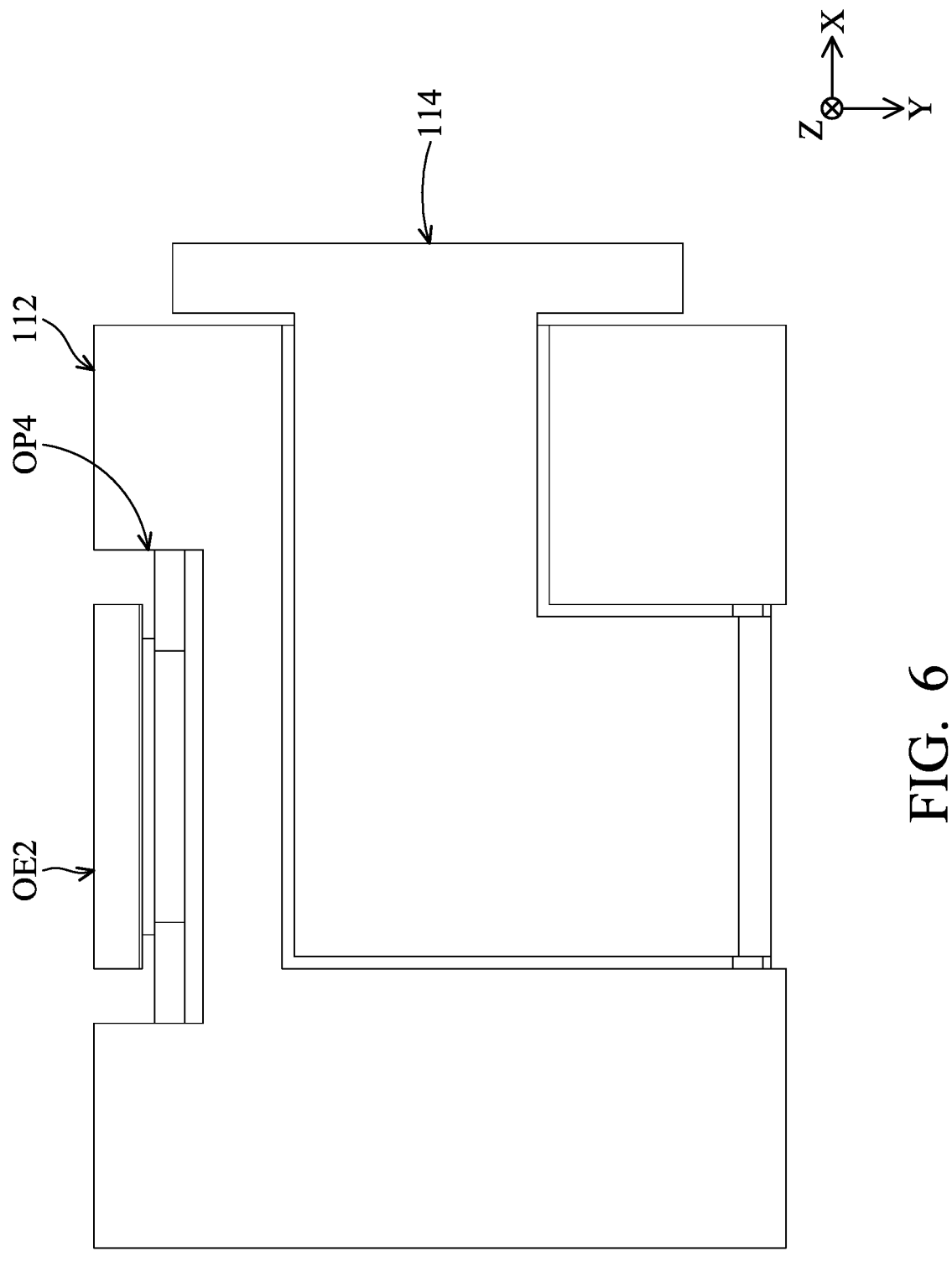

FIG. 6 is a bottom view of the first optical module 100A according to an embodiment of the present disclosure.

Figure 7:
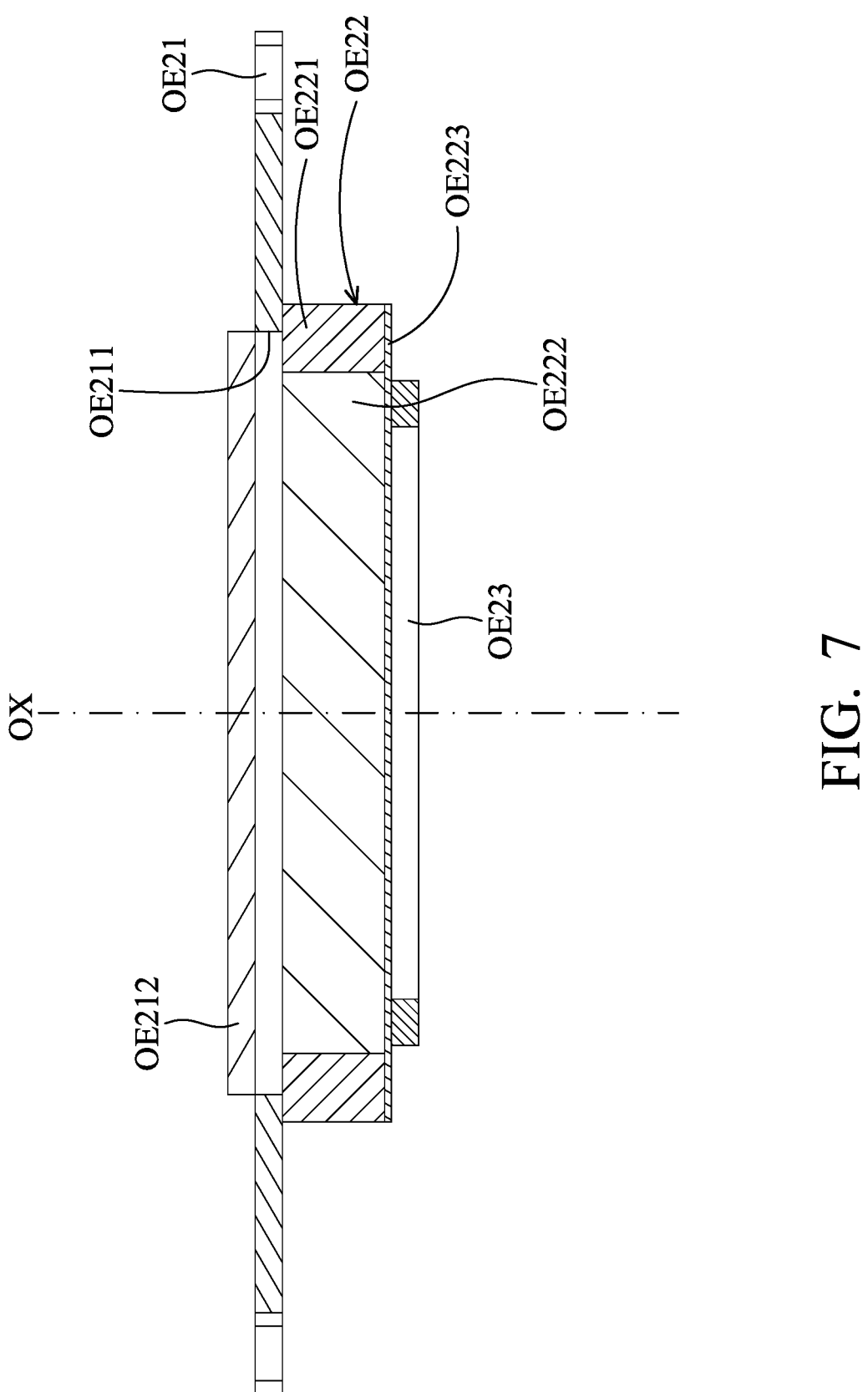

FIG. 7 is a cross-sectional view of the second optical element OE2 along line B-B in FIG. 5 according to an embodiment of the present disclosure.

Figure 8:
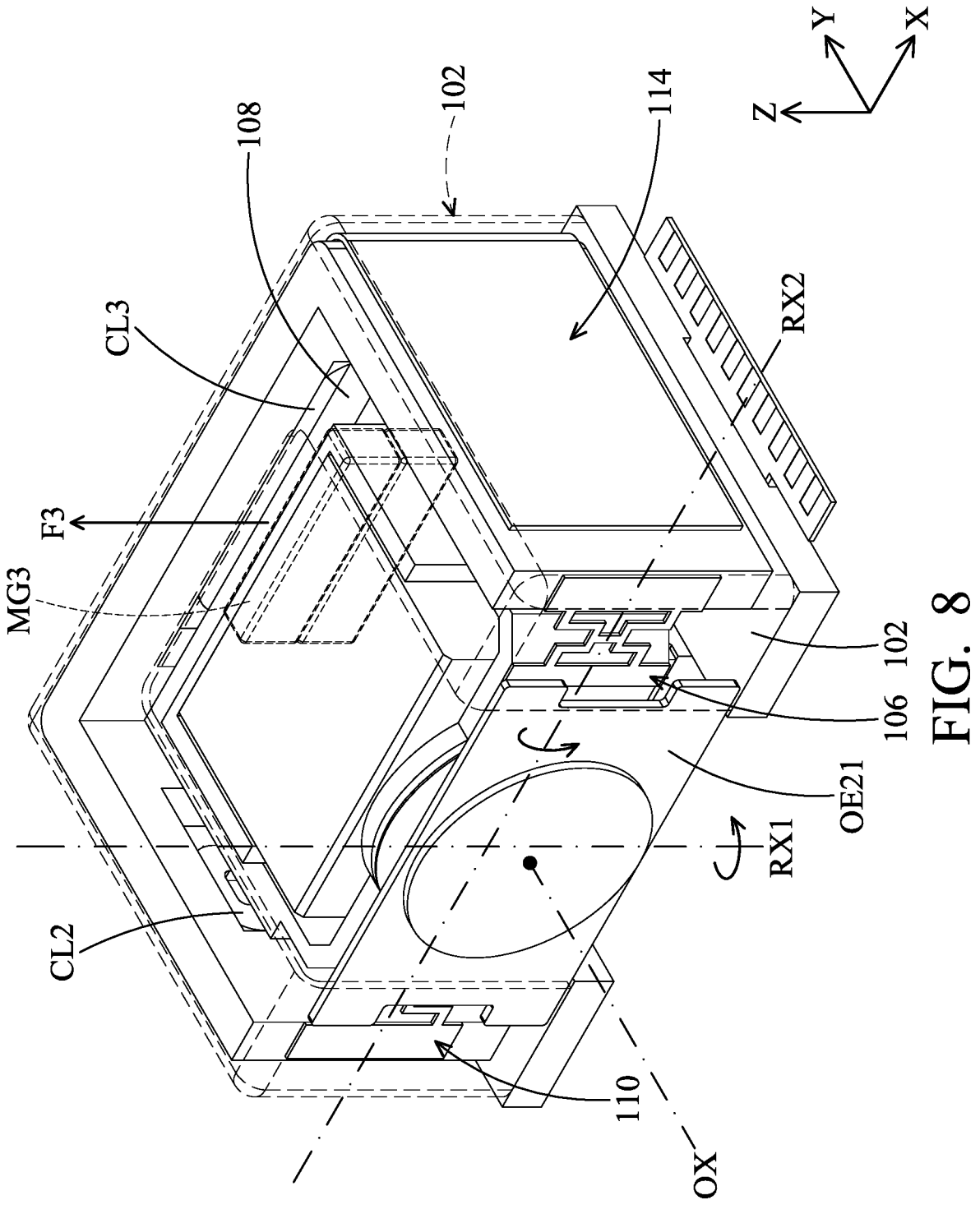

FIG. 8 is a perspective view of the first optical module 100A according to an embodiment of the present disclosure.

Figure 9:
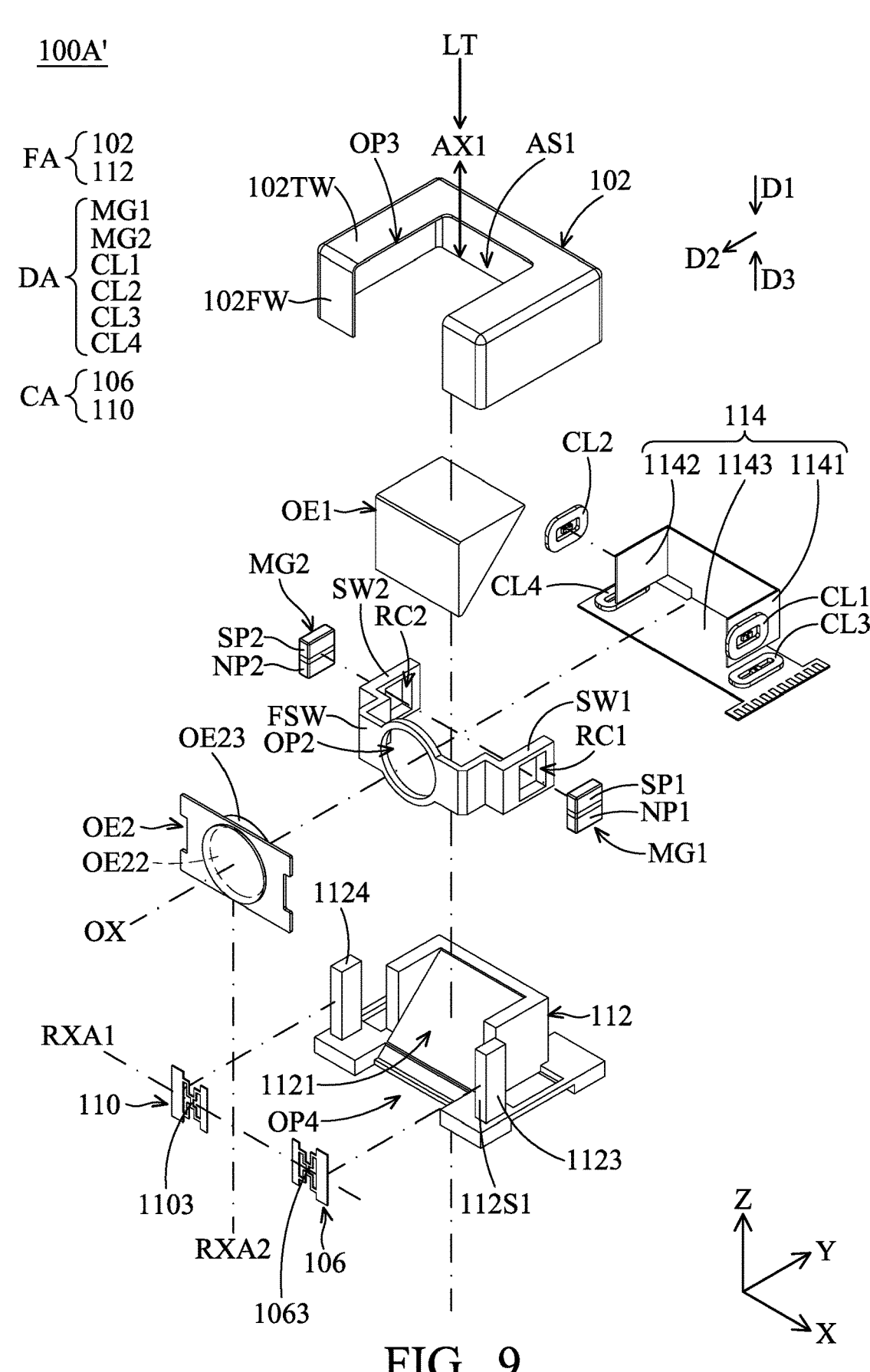

FIG. 9 is an exploded diagram of a first optical module 100A' according to another embodiment of the present disclosure.

Figure 10:
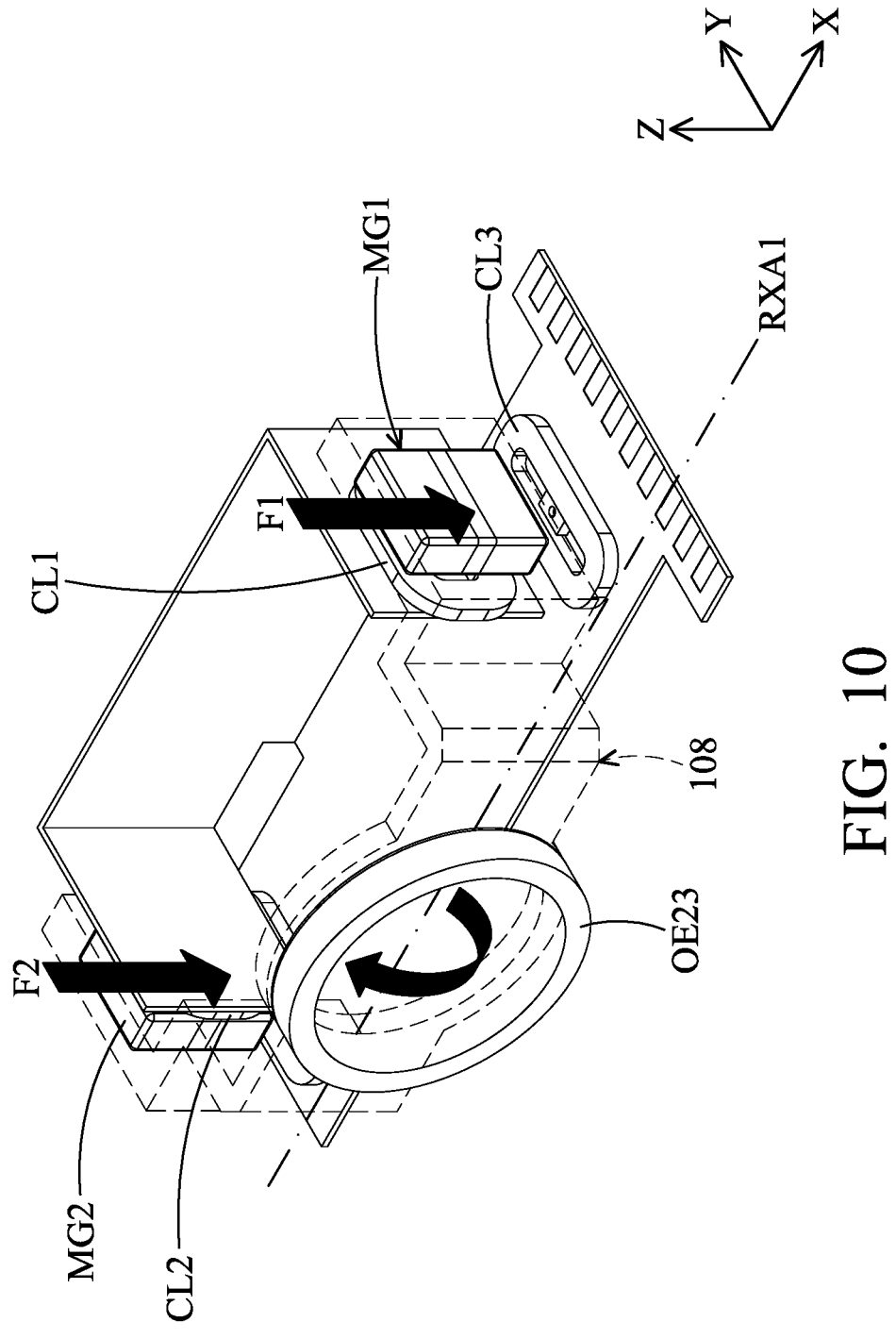
Figure 11:
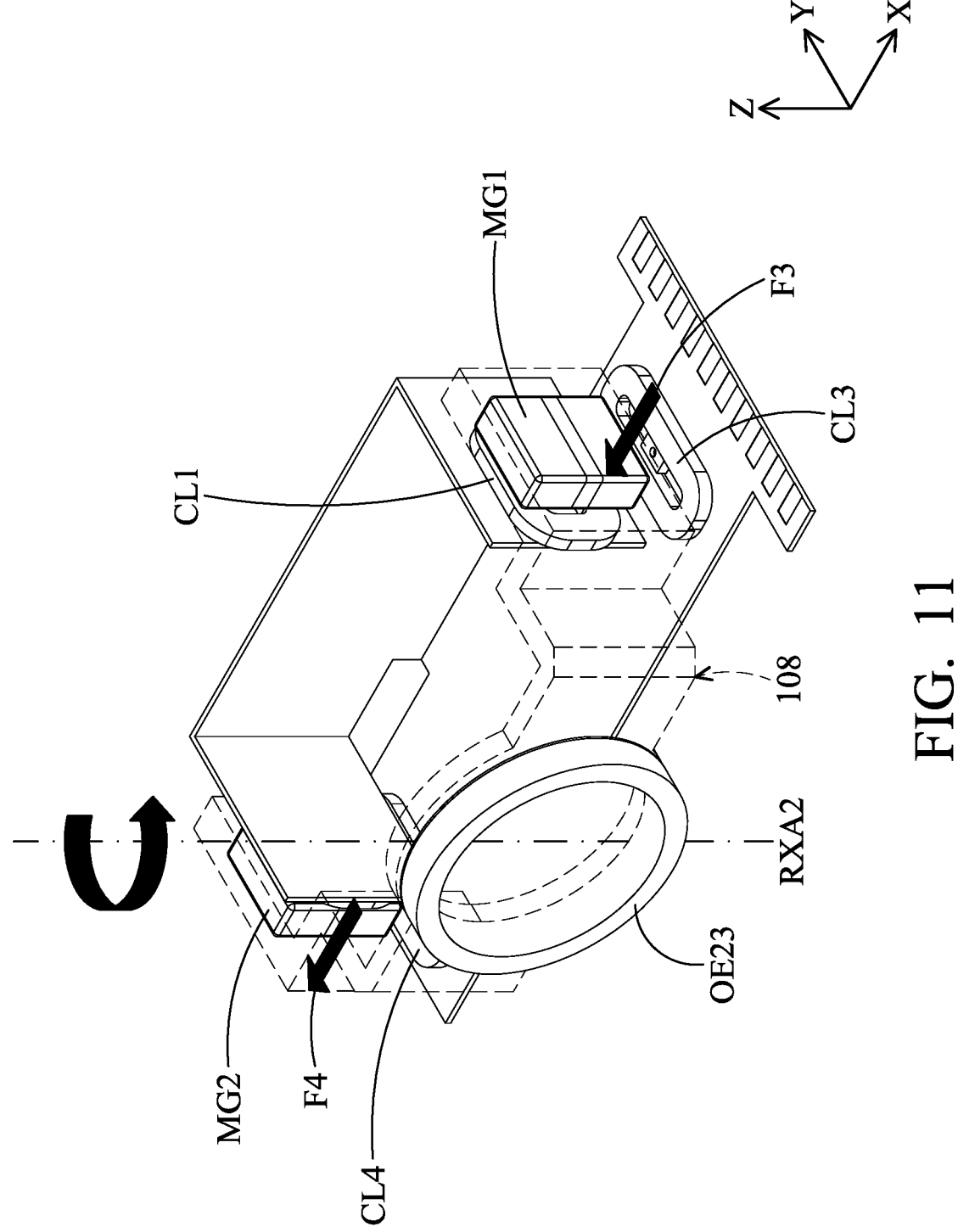

FIG. 10 and FIG. 11 are schematic diagrams illustrating that the driving assembly DA drives the movable part 108 to move around different axes according to another embodiment of the present disclosure.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Please refer to FIG. 1 to FIG. 3. FIG. 1 is a schematic diagram of an optical element driving mechanism 100 according to an embodiment of the present disclosure, FIG. 2 is an exploded diagram of a partial structure of the optical element driving mechanism 100 according to an embodiment of the present disclosure, and FIG. 3 is a cross-sectional view of the optical element driving mechanism 100 along line A-A in FIG. 1 according to an embodiment of the present disclosure. The optical element driving mechanism 100 can be an optical camera system and can be configured to hold and drive an optical element. The optical element driving mechanism 100 can be installed in various electronic devices or portable electronic devices, such as a smartphone, for allowing a user to perform the image capturing function. In this embodiment, the optical element driving mechanism 100 can be a voice coil motor (VCM) with an auto-focusing (AF) function, but it is not limited thereto. In other embodiments, the optical element driving mechanism 100 can also perform the functions of auto-focusing and optical image stabilization (OIS).

In this embodiment, the optical element driving mechanism 100 may include a first optical module 100A and a second optical module 100B. An external light LT enters the first optical module 100A along a first axis AX1 and is reflected by a first optical element OE1, then passes through a second optical element OE2 and is emitted from a third optical element OE3 of the second optical module 100B.

The first optical module 100A may have autofocus (AF) and/or optical image stabilization (OIS) functions, and the second optical module 100B may be a fixed lens, or may also have autofocus (AF) and/or optical image stabilization (OIS) functions. In other words, the functions of the two optical modules can be selected and matched with each other according to actual needs.

As shown in FIG. 2, the first optical module 100A may include a fixed assembly FA, a movable part 108, and a driving assembly DA. The movable part 108 is configured to be connected to the second optical element OE2. The second optical element OE2 corresponds to the first optical element OE1, and the movable part 108 is movable relative to the fixed assembly FA. The driving assembly DA is configured to drive the movable part 108 to move relative to the fixed assembly FA.

In this embodiment, as shown in FIG. 2, the fixed assembly FA includes an outer frame 102 and a base 112. The outer frame 102 is fixedly connected to the base 112 and forms a first accommodation space AS1 which is configured to accommodate the first optical element OE1. The first optical element OE1 may be a reflective prism, but it is not limited thereto.

Please refer to FIG. 1 to FIG. 5. FIG. 4 is a top view of the first optical module 100A according to an embodiment of the present disclosure, and FIG. 5 is a font view of the first optical module 100A according to an embodiment of the present disclosure. It should be noted that, in order to clearly represent the internal structure, the outer frame 102 in the figures is drawn with a dotted line, which does not mean that the outer frame 102 does not exist. The following figures are the same.

As shown in FIG. 2 and FIG. 4, the movable part 108 may include a second accommodation space AS2 configured to accommodate the first optical element OE1, and the second accommodation space AS2 is located in the first accommodation space AS1.

In this embodiment, the second optical element OE2 may define an optical axis OX, and the optical axis OX passes through the second optical element OE2 and the first optical element OE1. As shown in FIG. 2 and FIG. 5, when viewed along the optical axis OX, the movable part 108 has a long strip-shaped structure.

Furthermore, the movable part 108 may include a first side wall SW1, a second side wall SW2 and a first opening OP1. When viewed along the optical axis OX, the first side wall SW1 is located on one side of the first optical element OE1. When viewed along the optical axis OX, the second side wall SW2 is located on the other side of the first optical element OE1. When viewed along the optical axis OX, the first optical element OE1 is located between the first side wall SW1 and the second side wall SW2.

In addition, the first opening OP1 corresponds to the first optical element OE1, and when viewed along the first axis AX1 (FIG. 4), at least a portion of the first optical element OE1 is exposed from the first opening OP1. The first axis AX1 is not parallel to the optical axis OX, for example, perpendicular to the optical axis OX.

As shown in FIG. 2, the movable part 108 further includes a top wall FSW and a second opening OP2. The top wall FSW corresponds to the second optical element OE2, and the second opening OP2 corresponds to the second optical element OE2 and is located on the top wall FSW. The optical axis OX passes through the second opening OP2, and the second opening OP2 is communicated with the first opening OP1.

In this embodiment, the outer frame 102 of the fixed assembly FA includes a third opening OP3. The third opening OP3 corresponds to the second optical element OE2, and the third opening OP3 also corresponds to the first optical element OE1. As shown in FIG. 5, when viewed along the optical axis OX, the third opening OP3 is larger than the second opening OP2.

As shown in FIG. 2, the outer frame 102 has a first outer wall 102FW and a second outer wall 102TW, and the first outer wall 102FW and the second outer wall 102TW each have a plate-shaped structure.

Specifically, the aforementioned third opening OP3 is formed by the first outer wall 102FW and the second outer wall 102TW, and the first outer wall 102FW and the second outer wall 102TW are perpendicular to each other. That is, the third opening OP3 may have an L-shaped structure.

In addition, the base 112 has a plate-shaped structure, and the base 112 of the fixed assembly FA further includes a first supporting portion 1121 which is disposed on the base 112 to accommodate and support the first optical element OE1.

Specifically, the first optical element OE1 is fixedly connected to the first supporting portion 1121 of the fixed assembly FA.

As shown in FIG. 3, the aforementioned external light LT is incident on the third opening OP3 in a first direction D1, is reflected by the first optical element OE1, and then is emitted from the third opening OP3 in a second direction D2. The first direction D1 and the second direction D2 are not parallel to each other, for example, they are perpendicular to each other. In addition, the first direction D1 is parallel to the first axis AX1.

In this embodiment, the movable part 108 is movable relative to the first optical element OE1. Furthermore, as shown in FIG. 2 and FIG. 4, a first surface SF1 of the first side wall SW1 faces the first optical element OE1, and a second surface SF2 of the first side wall SW1 and the first surface SF1 face the opposite direction.

As shown in FIG. 4, there is a gap GP1 between the first surface SF1 and the base 112 of the fixed assembly FA, and there is a gap GP2 between the second surface SF2 and the base 112 of the fixed assembly FA.

Similarly, a third surface SF3 of the second side wall SW2 faces the first optical element OE1, and a fourth surface SF4 of the second side wall SW2 and the third surface SF3 face opposite directions.

There is a gap GP3 between the third surface SF3 and the base 112 of the fixed assembly FA, there is a gap GP4 between the fourth surface SF4 and the base 112 of the fixed assembly FA, and the third surface SF3 faces the first surface SF1. Based on this design, when the movable part 108 moves relative to the base 112, the movable part 108 does not collide with the base 112.

Next, please refer to FIG. 4 and FIG. 6. FIG. 6 is a bottom view of the first optical module 100A according to an embodiment of the present disclosure. As shown in FIG. 6, the base 112 of the fixed assembly FA further includes a fourth opening OP4 corresponding to the second optical element OE2.

As shown in FIG. 4, when viewed along the first axis AX1, the third opening OP3 overlaps at least portion of the fourth opening OP4, and the fourth opening OP4 is located at the base 112 (that is, formed by base 112).

As shown in FIG. 2, in this embodiment, the optical element driving mechanism 100 further includes a connecting assembly CA, so that the movable part 108 is movably connected to the fixed assembly FA through the connecting assembly CA. The connecting assembly CA may include a first elastic member 106 and a second elastic member 110.

Specifically, as shown in FIG. 5, the first elastic member 106 and the second elastic member 110 respectively have a first flexible portion 1063 and a second flexible portion 1103, the first flexible portion 1063 has flexibility, and the second flexible portion 1103 has flexibility.

As shown in FIG. 5, when viewed along the optical axis OX, the first flexible portion 1063, the first optical element OE1, and the second flexible portion 1103 are arranged along a second axis AX2, and the second axis AX2 is not parallel to the first axis AX1 (that is, perpendicular to each other).

When viewed along the optical axis OX, a longitudinal axis LX of the movable part 108 having a long strip-shaped structure is parallel to the second axis AX2. When viewed along the optical axis OX, the first flexible portion 1063 and the second flexible portion 1103 are arranged along the second axis AX2. When viewed along the optical axis OX, the center of the second optical element OE2 is located between the first flexible portion 1063 and the second flexible portion 1103.

Furthermore, as shown in FIG. 5, the first elastic member 106 further has a first connecting end 1061 which is fixedly connected to the base 112 of the fixed assembly FA. Specifically, the first connecting end 1061 is affixed to a first setting portion 1123 of the fixed assembly FA.

Similarly, the first elastic member 106 further has a second connecting end 1062 which is fixedly connected to the top wall FSW of the movable part 108, and the first flexible portion 1063 is connected between the first connecting end 1061 and the second connecting end 1062.

Similarly, the second elastic member 110 may have a third connecting end 1101 which is fixedly connected to the base 112 of the fixed assembly FA. Specifically, the third connecting end 1101 is affixed to a second setting portion 1124 of the fixed assembly FA.

The second elastic member 110 further has a fourth connecting end 1102 which is fixedly connected to the top wall FSW of the movable part 108, and the second flexible portion 1103 is connected between the third connecting end 1101 and the fourth connecting end 1102.

As shown in FIG. 5, when viewed along the optical axis OX, the first setting portion 1123, the second optical element OE2 and the second setting portion 1124 are arranged along the second axis AX2.

As shown in FIG. 2, the first setting portion 1123 and the second setting portion 1124 correspond to the driving assembly DA, and as shown in FIG. 4, a first avoidance portion AP1 of the movable part 108 corresponds to the first setting portion 1123. Specifically, the first avoidance portion AP1 has a recessed structure. Similarly, a second avoidance portion AP2 of the movable part 108 corresponds to the second setting portion 1124.

As shown in FIG. 4, when viewed in a first direction D1, a portion of the first optical element OE1 is exposed from the third opening OP3. When viewed in the first direction D1, a portion of the second optical element OE2 is exposed from the third opening OP3.

Furthermore, as shown in FIG. 2 and FIG. 6, when viewed in a third direction D3, the first optical element OE1 is not exposed from the fourth opening OP4. When viewed in the third direction D3, a portion of the second optical element OE2 is exposed from the fourth opening OP4. The third direction D3 is opposite to the first direction D1.

In this embodiment, at least a portion of the driving assembly DA is disposed in the first setting portion 1123 and the second setting portion 1124. It is worth noting that, as shown in FIG. 5, when viewed along the optical axis OX, the first optical module 100A of the optical element driving mechanism 100 does not include any flexible portion which is arranged with the second optical element OE2 along the first axis AX1 (for example, a flexible portion similar to the first flexible portion 1063). Therefore, such a configuration can significantly reduce the height of the optical element driving mechanism 100 along the Z-axis so as to achieve the purpose of thinning.

In this embodiment, the first optical element OE1 and the second optical element OE2 may have different materials. For example, the first optical element OE1 and the second optical element OE2 may be in different material states. Specifically, the second optical element OE2 can be a liquid lens, and the first optical element OE1 can be a solid prism lens, but they are not limited thereto.

Next, please refer to FIG. 7 and FIG. 8. FIG. 7 is a cross-sectional view of the second optical element OE2 along line B-B in FIG. 5 according to an embodiment of the present disclosure, and FIG. 8 is a perspective view of the first optical module 100A according to an embodiment of the present disclosure. In this embodiment, the second optical element OE2 may include an optical fixed portion OE21, a main body OE22 and a pushing portion OE23.

As shown in FIG. 8, the optical fixed portion OE21 has a plate-shaped structure which is fixedly connected to the outer frame 102 of the fixed assembly FA. For example, the optical fixed portion OE21 and the outer frame 102 are both made of metal material, so that the optical fixed portion OE21 can be affixed to the outer frame 102 of the fixed assembly FA by laser welding. It is important to note that the optical fixed portion OE21 is not elastic or flexible.

In addition, as shown in FIG. 8, when viewed along the optical axis OX, the optical fixed portion OE21 overlaps at least portion of the connecting assembly CA, such as overlapping the first elastic member 106 and the second elastic member 110.

Furthermore, the optical fixed portion OE21 has an optical opening OE211, so that the aforementioned external light LT can pass through the main body OE22 along the optical axis OX. The optical fixed portion OE21 may further have a translucent element OE212, such as a lens, which is fixedly disposed on the optical fixed portion OE21.

The main body OE22 may have an accommodation frame OE221 to accommodate the liquid OE222 therein, and a thin film OE223 is provided on the bottom of the accommodation frame OE221 to seal the liquid OE222 within the accommodation frame OE221.

Furthermore, the pushing portion OE23 has a ring-shaped structure which is fixedly connected to the movable part 108 and the thin film OE223 and located between the movable part 108 and the thin film OE223. The pushing portion OE23 can be driven by the movable part 108 to push the thin film OE223 and the liquid OE222.

Please refer to FIG. 2, FIG. 4 and FIG. 8. In this embodiment, the driving assembly DA may include a first driving element MG1 and a second driving element MG2 which are respectively disposed in the recesses of the first side wall SW1 and the second side wall SW2. Furthermore, the driving assembly DA may further include a first coil CL1 and a second coil CL2, respectively corresponding to the first driving element MG1 and the second driving element MG2.

In this embodiment, the first optical module 100A of the optical element driving mechanism 100 further includes a circuit assembly 114 which is fixedly disposed on the base 112 of the fixed assembly FA. The circuit assembly 114 is, for example, a flexible circuit board (FPC board) which may include a first circuit portion 1141 and a second circuit portion 1142, and the first coil CL1 and the second coil CL2 are respectively fixedly disposed on the first circuit portion 1141 and the second circuit portion 1142.

As shown in FIG. 2, the base 112 may include the aforementioned first setting portion 1123 and the second setting portion 1124. Each of the first setting portion 1123 and the second setting portion 1124 may be a side wall of the base 112.

The first setting portion 1123 and the second setting portion 1124 may respectively form a first accommodation hole RC1 and a second accommodation hole RC2, and when the circuit assembly 114 is affixed to the base 112, the first coil CL1 and the second coil CL2 are respectively located in the first accommodation hole RC1 and the second accommodation hole RC2.

When the first driving element MG1 and the second driving element MG2 respectively act with the first coil CL1 and the second coil CL2 to generate the electromagnetic driving forces F1 and F2 respectively (FIG. 4), the first driving element MG1 and the second driving element MG2 are configured to drive the movable part 108 to rotate around a first rotation axis RX1, so that the pushing portion OE23 pushes the main body OE22 to change the optical properties of the second optical element OE2, thereby achieving the optical image stabilization function.

It is worth noting that, as shown in FIG. 5, when viewed along the optical axis OX, the first rotation axis RX1 is located between the first flexible portion 1063 and the second flexible portion 1103, and the first rotation axis RX1 can intersect with the optical axis OX.

In addition, as shown in FIG. 2, the movable part 108 may further include a rear side wall RSW which is connected between the first side wall SW1 and the second side wall SW2. As shown in FIG. 4, when viewed along the first axis AX1, there is a gap GP5 between the rear side wall RSW and the base 112. When viewed along the first axis AX1, the movable part 108 surrounds the first optical element OE1.

Furthermore, the driving assembly DA further includes a third driving element MG3 which is disposed on the rear side wall RSW, and the driving assembly DA further includes a third coil CL3 corresponding to the third driving element MG3. The first driving element MG1 to the third driving element MG3 are magnets, but they are not limited thereto.

Correspondingly, the circuit assembly 114 may further include a third circuit portion 1143 which is connected between the first circuit portion 1141 and the second circuit portion 1142, and the third coil CL3 is fixedly disposed on the third circuit portion 1143.

Correspondingly, the base 112 may further include a third setting portion 1125 which is connected between the first setting portion 1123 and the second setting portion 1124, and the third setting portion 1125, the first setting portion 1123 and the second setting portion 1124 are integrally formed in one piece.

A third accommodation hole RC3 may be formed on the third setting portion 1125, and when the third circuit portion 1143 is affixed to the third setting portion 1125, the third coil CL3 is located in the third accommodation hole RC3. When viewed along the first axis AX1, the third driving element MG3 and the third coil CL3 are arranged along the optical axis OX.

As shown in FIG. 8, when the third driving element MG3 acts with the second coil CL2 to generate an electromagnetic driving force F3, the third driving element MG3 is configured to drive the movable part 108 to rotate around a second rotation axis RX2, so that the pushing portion OE23 pushes the main body OE22 to change the optical properties of the second optical element OE2. The second rotation axis RX2 is not parallel to the first rotation axis RX1. For example, the second rotation axis RX2 is perpendicular to the first rotation axis RX1.

As shown in FIG. 5, when viewed along the optical axis OX, the second rotation axis RX2 passes through the first flexible portion 1063 and the second flexible portion 1103, and the second rotation axis RX2 can intersect with the first rotation axis RX1 and the optical axis OX, but they are not limited thereto.

It is worth explaining that in order to achieve the above driving method, as shown in FIG. 2, the North-pole NP1 and South-pole SP1 of the first driving element MG1 are arranged along the optical axis OX, and the North-pole NP2 and South-pole SP2 of the second driving element MG2 are arranged along the optical axis OX, while the North-pole NP3 and South-pole SP3 of the third driving element MG3 are arranged along the first axis AX1.

Next, please refer to FIG. 9, which is an exploded diagram of a first optical module 100A' according to another embodiment of the present disclosure. The first optical module 100A' of this embodiment is similar to the aforementioned first optical module 100A. The difference between them is that this embodiment omits the third driving element MG3, and in addition to the first coil CL1 and the second coil CL2, the driving assembly DA further includes a third coil CL3 and a fourth coil CL4.

The first coil CL1 and the second coil CL2 respectively correspond to the first driving element MG1 and the second driving element MG2, and the first coil CL1 and the second coil CL2 are respectively fixedly disposed on the first circuit portion 1141 and the second circuit portion 1142.

Furthermore, the third coil CL3 and the fourth coil CL4 also correspond to the first driving element MG1 and the second driving element MG2 respectively. The circuit assembly 114 also includes a third circuit portion 1143 which is connected between the first circuit portion 1141 and the second circuit portion 1142, and the third coil CL3 and the fourth coil CL4 are fixedly disposed on the third circuit portion 1143.

In addition, it should be noted that the North-pole NP1 and South-pole SP1 of the first driving element MG1 in this embodiment are arranged along the first axis AX1, and the North-pole NP2 and South-pole SP2 of the second driving element MG2 are arranged along the first axis AX1.

Next, please refer to FIG. 10 and FIG. 11. FIG. 10 and FIG. 11 are schematic diagrams illustrating that the driving assembly DA drives the movable part 108 to move around different axes according to another embodiment of the present disclosure.

As shown in FIG. 10, when the first driving element MG1 and the second driving element MG2 respectively act with the first coil CL1 and the second coil CL2 to generate the electromagnetic driving forces F1 and F2, the first driving element MG1 and the second driving element MG2 are configured to drive the movable part 108 to rotate around a first rotation axis RXA1.

Specifically, the electromagnetic driving forces F1 and F2 are directed toward the −Z axis, and the first rotation axis RXA1 is parallel to the X-axis. Furthermore, similar to the previous embodiment, the movable part 108 is movably connected to the base 112 through the first elastic member 106 and the second elastic member 110, and the first rotating axis RXA1 passes through the first flexible portion 1063 and the second flexible portion 1103.

As shown in FIG. 9 and FIG. 10, the movable part 108 is driven by the electromagnetic driving forces F1 and F2 to rotate around the first rotation axis RXA1 relative to the base 112, and the first setting portion 1123 and the second setting portion 1124 of the base 112 serve as support points respectively for the first elastic member 106 and the second elastic member 110, so that the movable part 108 performs a nose-up motion around the first rotation axis RXA1. On the contrary, when the electromagnetic driving forces F1 and F2 are directed toward the +Z-axis, the movable part 108 can be driven to perform a nose-down motion.

On the other hand, as shown in FIG. 11, when the third coil CL3 and the fourth coil CL4 respectively act with the first driving element MG1 and the second driving element MG2 to generate the electromagnetic driving forces F3 and F4, the first driving element MG1 and the second driving element MG2 are configured to drive the movable part 108 to rotate around a second rotation axis RXA2. Based on the above driving method, the pushing portion OE23 can push the main body OE22 to change the optical properties of the second optical element OE2;

Specifically, the electromagnetic driving forces F3 and F4 are directed toward the −X axis, and the second rotation axis RXA2 is parallel to the Z-axis. As shown in FIG. 11, the movable part 108 is driven by the electromagnetic driving forces F3 and F4 to rotate around the second rotation axis RXA2 relative to the base 112, and the first setting portion 1123 and the second setting portion 1124 of the base 112 serve as support points respectively for the first elastic member 106 and the second elastic member 110, so that the movable part 108 perform a Yaw-left motion. On the contrary, when the electromagnetic driving forces F3 and F4 are directed toward the +X axis, the movable part 108 can be driven to perform a Yaw-right motion.

Similar to the previous embodiment, when viewed along the optical axis OX, the second rotation axis RXA2 is located between the first flexible portion 1063 and the second flexible portion 1103.

The present disclosure provides an optical element driving mechanism 100, which can be a periscope lens mechanism, including a fixed assembly FA, a driving assembly DA, a movable part 108 and a connecting assembly CA. The movable part 108 is movably connected to the base 112 of the fixed assembly FA through the connecting assembly CA, and the movable part 108 surrounds the first optical element OE1. The optical fixed portion OE21 of the second optical element OE2 is affixed to the outer frame 102 of the fixed assembly FA, and the pushing portion OE23 is fixedly connected to the movable part 108.

The driving assembly DA is configured to drive the movable part 108 to move relative to the base 112 and the first optical element OE1 to drive the pushing portion OE23 to push the thin film OE223 and the liquid OE222, thereby changing the optical properties of the second optical element OE2, so as to achieve the purpose of optical image stabilization. Because there is a gap between the movable part 108 and the base 112, the movable part 108 does not collide with the base 112 and cause damage when rotating.

It is worth noting that the external light LT is emitted into the first optical module 100A along the first axis AX1 (the Z-axis), and the first optical module 100A does not include any flexible portion which is arranged with the second optical element OE2 along the first axis AX1. Therefore, such a configuration can significantly reduce the height of the optical element driving mechanism 100 along the Z-axis so as to achieve the purpose of thinning.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism for accommodating a first optical element and comprising:
   a fixed assembly:
   a movable part, configured to be connected to a second optical element, wherein the second optical element corresponds to the first optical element, and the movable part is movable relative to the fixed assembly;
   a connecting assembly, wherein the movable part is movably connected to the fixed assembly through the connecting assembly; and
   a driving assembly, configured to drive the movable part to move relative to the fixed assembly;
   wherein the fixed assembly comprises a first accommodation space configured to accommodate the first optical element;
   the connecting assembly comprises a first elastic member and a second elastic member;
   the first elastic member and the second elastic member respectively have a first flexible portion and a second flexible portion;
   the first elastic member has a first connecting end which is fixedly connected to the fixed assembly;
   the first connecting end is affixed to a first setting portion of the fixed assembly;
   the first elastic member further has a second connecting end which is fixedly connected to the movable part;
   the first flexible portion is connected between the first connecting end and the second connecting end;
   the second elastic member has a third connecting end which is fixedly connected to the fixed assembly:
   the third connecting end is affixed to a second setting portion of the fixed assembly;
   the second elastic member further has a fourth connecting end which is fixedly connected to the movable part; and
   the second flexible portion is connected between the third connecting end and the fourth connecting end.

2. The optical element driving mechanism as claimed in claim 1, wherein
   the movable part comprises a second accommodation space configured to accommodate the first optical element;
   the second accommodation space is located in the first accommodation space;
   the second optical element defines an optical axis;
   the optical axis passes through the second optical element and the first optical element; and
   when viewed along the optical axis, the movable part has a long strip-shaped structure.

3. The optical element driving mechanism as claimed in claim 2, wherein
   the movable part further comprises a first side wall, a second side wall and a first opening;
   when viewed along the optical axis, the first side wall is located on one side of the first optical element;
   when viewed along the optical axis, the second side wall is located on other side of the first optical element;
   when viewed along the optical axis, the first optical element is located between the first side wall and the second side wall;
   the first opening corresponds to the first optical element;

when viewed along a first axis, at least a portion of the first optical element is exposed from the first opening; and
   the first axis is not parallel to the optical axis.

4. The optical element driving mechanism as claimed in claim 3, wherein
   the movable part further comprises a top wall and a second opening;
   the top wall corresponds to the second optical element;
   the second opening corresponds to the second optical element and is located on the top wall; and
   the optical axis passes through the second opening.

5. The optical element driving mechanism as claimed in claim 4, wherein
   the fixed assembly further comprises a third opening;
   the third opening corresponds to the second optical element;
   the third opening corresponds to the first optical element; and
   when viewed along the optical axis, the third opening is larger than the second opening.

6. The optical element driving mechanism as claimed in claim 5, wherein
   the fixed assembly further comprises a base and an outer frame;
   the base has a plate-shaped structure;
   the outer frame is fixedly connected to the base and forms the first accommodation space;
   the outer frame has a first outer wall and a second outer wall; and
   the first outer wall and the second outer wall each have a plate-shaped structure.

7. The optical element driving mechanism as claimed in claim 6, wherein
   the fixed assembly further comprises a first supporting portion which is disposed on the base to accommodate the first optical element;
   the first optical element is fixedly connected to the first supporting portion of the fixed assembly;
   the third opening is formed by the first outer wall and the second outer wall;
   the first outer wall and the second outer wall are perpendicular to each other;
   an external light is incident on the third opening in a first direction and is emitted in a second direction from the third opening;
   the first direction is not parallel to the second direction;
   the first direction is parallel to the first axis; and
   the movable part is movable relative to the first optical element.

8. The optical element driving mechanism as claimed in claim 7, wherein
   a first surface of the first side wall faces the first optical element;
   a second surface of the first side wall and the first surface face opposite directions;
   there is a gap between the first surface and the fixed assembly;
   there is another gap between the second surface and the fixed assembly;
   a third surface of the second side wall faces the first optical element;
   a fourth surface of the second side wall and the third surface face opposite directions;
   there is another gap between the third surface and the fixed assembly;

17 there is another gap between the fourth surface and the fixed assembly;

the third surface faces the first surface;

the fixed assembly further comprises a fourth opening corresponding to the second optical element;

when viewed along the first axis, the third opening overlaps at least a portion of the fourth opening; and the fourth opening is located at the base.

9. The optical element driving mechanism as claimed in claim 8, wherein the first flexible portion has flexibility; and the second flexible portion has flexibility.

10. The optical element driving mechanism as claimed in claim 9, wherein when viewed along the optical axis, the first flexible portion and the first optical element are arranged along a second axis;

the second axis is not parallel to the first axis;

when viewed along the optical axis, a longitudinal axis of the movable part having a long strip-shaped structure is parallel to the second axis;

when viewed along the optical axis, the first flexible portion and the second flexible portion are arranged along the second axis; and when viewed along the optical axis, a center of the second optical element is located between the first flexible portion and the second flexible portion.

11. The optical element driving mechanism as claimed in claim 10, wherein when viewed along the optical axis, the first setting portion, the second optical element and the second setting portion are arranged along the second axis;

the first setting portion and the second setting portion correspond to the driving assembly;

a first avoidance portion of the movable part corresponds to the first setting portion;

the first avoidance portion has a recessed structure.

12. The optical element driving mechanism as claimed in claim 11, wherein when viewed in the first direction, a portion of the first optical element is exposed from the third opening;

when viewed in the first direction, a portion of the second optical element is exposed from the third opening;

when viewed in a third direction, the first optical element is not exposed from the fourth opening;

when viewed in the third direction, a portion of the second optical element is exposed from the fourth opening;

the third direction is opposite to the first direction;

at least a portion of the driving assembly is disposed on the first setting portion and the second setting portion; and when viewed along the optical axis, the optical element driving mechanism does not include any flexible portion which is arranged with the second optical element along the first axis.

13. The optical element driving mechanism as claimed in claim 12, wherein the first optical element and the second optical element have different materials;

the first optical element and the second optical element have different material states;

the second optical element is a liquid lens; and the first optical element comprises a solid lens.

14. The optical element driving mechanism as claimed in claim 13, wherein the second optical element comprises an optical fixed portion, a main body and a pushing portion;

18 the optical fixed portion is fixedly connected to the fixed assembly;

the optical fixed portion is affixed to the fixed assembly by laser welding;

the optical axis passes through the main body;

the pushing portion is fixedly connected to the movable part;

the pushing portion has a ring-shaped structure;

when viewed along the optical axis, the optical fixed portion overlaps at least a portion of the connecting assembly;

the driving assembly comprises a first driving element and a second driving element which are respectively disposed on the first side wall and the second side wall; and the first driving element and the second driving element are configured to drive the movable part to rotate around a first rotation axis, so that the pushing portion pushes the main body to change optical properties of the second optical element.

15. The optical element driving mechanism as claimed in claim 14, wherein the movable part further comprises a rear side wall which is connected between the first side wall and the second side wall;

when viewed along the first axis, there is another gap between the rear side wall and the base;

when viewed along the first axis, the movable part surrounds the first optical element; and when viewed along the optical axis, the first rotation axis is located between the first flexible portion and the second flexible portion.

16. The optical element driving mechanism as claimed in claim 15, wherein the driving assembly further comprises a third driving element which is disposed on the rear side wall;

the third driving element is configured to drive the movable part to rotate around a second rotation axis, so that the pushing portion pushes the main body to change the optical properties of the second optical element;

when viewed along the optical axis, the second rotation axis passes through the first flexible portion and the second flexible portion;

the second rotation axis is not parallel to the first rotation axis;

the second rotation axis is perpendicular to the first rotation axis;

North-pole and South-pole of each of the first driving element and the second driving element are arranged along the optical axis; and North-pole and South-pole of the third driving element are arranged along the first axis.

17. The optical element driving mechanism as claimed in claim 16, wherein the driving assembly further comprises a first coil and a second coil, corresponding to the first driving element and the second driving element respectively;

the optical element driving mechanism further comprises a circuit assembly which is fixedly disposed on the base of the fixed assembly;

the circuit assembly comprises a first circuit portion and a second circuit portion;

the first coil and the second coil are respectively fixedly disposed on the first circuit portion and the second circuit portion;

the base comprises the first setting portion and the second setting portion;

the first setting portion and the second setting portion respectively form a first accommodation hole and a second accommodation hole;

the first coil and the second coil are respectively located in the first accommodation hole and the second accommodation hole;

the driving assembly further comprises a third coil corresponding to the third driving element;

the circuit assembly further comprises a third circuit portion which is connected between the first circuit portion and the second circuit portion;

the third coil is fixedly disposed on the third circuit portion;

the base further comprises a third setting portion which is connected between the first setting portion and the second setting portion;

the third setting portion, the first setting portion and the second setting portion are integrally formed in one piece;

a third accommodation hole is formed on the third setting portion;

the third coil is located in the third accommodation hole; and the third driving element and the third coil are arranged along the optical axis.

18. The optical element driving mechanism as claimed in claim 14, wherein

North-pole and South-pole of each of the first driving element and the second driving element are arranged along the first axis;

the driving assembly further comprises a first coil and a second coil, corresponding to the first driving element and the second driving element respectively;

the optical element driving mechanism further comprises a circuit assembly which is fixedly disposed on the base of the fixed assembly;

the circuit assembly comprises a first circuit portion and a second circuit portion; and the first coil and the second coil are respectively fixedly disposed on the first circuit portion and the second circuit portion.

19. The optical element driving mechanism as claimed in claim 18, wherein the driving assembly further comprises a third coil and a fourth coil, corresponding to the first driving element and the second driving element respectively;

the circuit assembly further comprises a third circuit portion which is connected to the first circuit portion and the second circuit portion;

the third coil and the fourth coil are fixedly disposed on the third circuit portion;

the third coil and the fourth coil are configured to respectively act with the first driving element and the second driving element to generate an electromagnetic driving force, thereby driving the movable part to rotate around a second rotation axis, so that the pushing portion pushes the main body to change the optical properties of the second optical element;

when viewed along the optical axis, the second rotation axis is located between the first flexible portion and the second flexible portion; and when viewed along the optical axis, the first rotation axis passes through the first flexible portion and the second flexible portion.

* * * * *